(12) United States Patent
Hackney

(10) Patent No.: US 7,844,732 B2
(45) Date of Patent: *Nov. 30, 2010

(54) MANAGEMENT OF NETWORK QUALITY OF SERVICE

(75) Inventor: Bede K. C. Hackney, Glenmore Park (AU)

(73) Assignee: Packeteer, Inc., Cupertino, CA (US)

(*) Notice: Subject to any disclaimer, the term of this patent is extended or adjusted under 35 U.S.C. 154(b) by 119 days.

This patent is subject to a terminal disclaimer.

(21) Appl. No.: 12/037,494

(22) Filed: Feb. 26, 2008

(65) Prior Publication Data

US 2009/0034523 A1    Feb. 5, 2009

Related U.S. Application Data

(63) Continuation of application No. 10/196,538, filed on Jul. 15, 2002, now Pat. No. 7,359,984.

(51) Int. Cl.
    *G06F 15/173*    (2006.01)
(52) U.S. Cl. .................... 709/238; 709/223; 709/239
(58) Field of Classification Search .............. None
    See application file for complete search history.

(56) References Cited

U.S. PATENT DOCUMENTS

| | | | |
|---|---|---|---|
| 6,081,900 A | 6/2000 | Subramaniam et al. | |
| 6,466,985 B1 | 10/2002 | Goyal et al. | |
| 6,480,508 B1 | 11/2002 | Mwikalo et al. | |
| 6,532,493 B1 | 3/2003 | Aviani et al. | |
| 6,570,851 B1 | 5/2003 | Koskelainen et al. | |
| 6,693,912 B1 | 2/2004 | Wang | |
| 6,751,661 B1 | 6/2004 | Geddes | |
| 6,836,462 B1 | 12/2004 | Albert et al. | |
| 6,898,641 B1 | 5/2005 | Kobayashi | |
| 2002/0073226 A1* | 6/2002 | Sridhar et al. | 709/235 |
| 2002/0122429 A1 | 9/2002 | Griggs | |
| 2002/0161867 A1 | 10/2002 | Cochran et al. | |
| 2002/0196793 A1 | 12/2002 | Samba et al. | |
| 2003/0033467 A1 | 2/2003 | Yoshizawa et al. | |
| 2003/0055947 A1 | 3/2003 | Haneda | |
| 2003/0061376 A1 | 3/2003 | Li et al. | |
| 2003/0191829 A1 | 10/2003 | Masters et al. | |
| 2003/0227907 A1 | 12/2003 | Choi et al. | |

OTHER PUBLICATIONS

Sisalem, Dorgham, and Schulzrinne, Henning. ISCC 2000-5th IEEE Symposium on Computers and Communications. Adaptive Load Service (ALS): An ABR-like service for the Internet. 2000. pp. 482-487.

* cited by examiner

*Primary Examiner*—Hassan Phillips
(74) *Attorney, Agent, or Firm*—Baker Botts L.L.P.

(57) ABSTRACT

In one embodiment, a router is deployed on a local area network (LAN) in addition to any routers deployed on a wide area network (WAN) coupled with the LAN having the router. A service management device is coupled between the two routers. The service management device provides management processing, for example, quality of service (QoS) processing, traffic shaping, type of service (ToS) processing, or class of service (CoS) processing. For messages between devices both coupled to the WAN router, the WAN router diverts the messages to the LAN router. The LAN router then returns the messages back to the WAN router through the service management device, which provides management processing. The WAN router then forwards the processed message to the destination device.

6 Claims, 5 Drawing Sheets

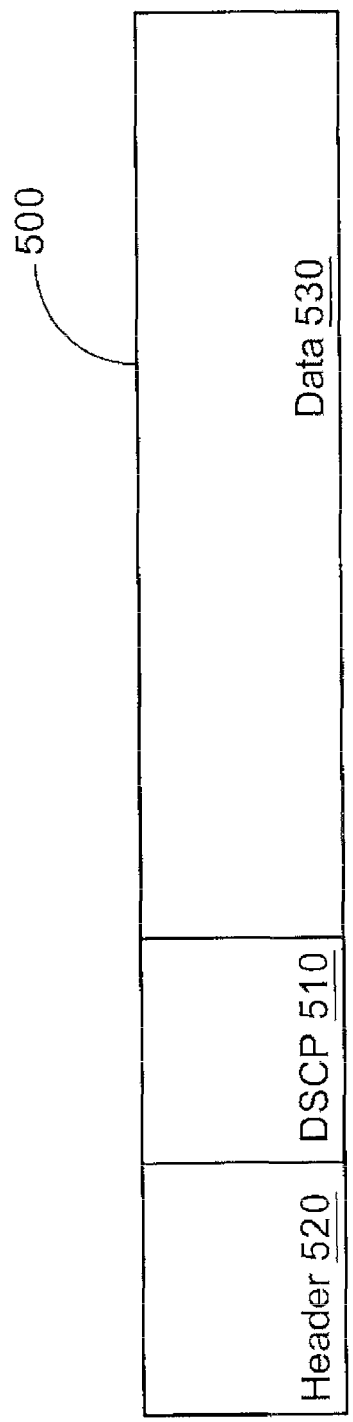

MANAGEMENT OF NETWORK QUALITY OF SERVICE

RELATED APPLICATIONS

This application is a continuation of U.S. application Ser. No. 10/196,538, filed Jul. 15, 2002 entitled "Management of Network Quality of Service", now U.S. Pat. No. 7,359,984 B1.

FIELD

The invention relates to network management. More particularly, the invention relates to techniques for managing quality of service of network traffic.

BACKGROUND

In current network architectures it is possible for traffic to pass between interfaces of a single router without being processed by a quality of service (QoS) device. For example, as illustrated in FIG. 1, a message can pass from host 145 to host 155 in wide area network (WAN) 100 without being processed by QoS device 110, which provides quality of service processing to WAN 100. A message generated by host 145 and designated for host 155 is sent through routers 140, 130 and 150 to host 155. Only messages that pass from router 130 to QoS device 110 receive quality of service processing. That is, only messages that pass from router 130 to local area network (LAN) 120 or from LAN 120 to router 130 receive quality of service processing. Thus, the configuration of FIG. 1 cannot guarantee quality of service processing for all messages.

Various solutions have been provided for this problem in the prior art. For example, traffic from router 140 and router 150 can be directed to QoS device 110 by separate links. This solution is expensive and provides limited scalability. Simple Network Management Protocol (SNMP) can be used to communicate between QoS device 110 and router 130 to use excess bandwidth provided by QoS device 110 to provide quality of service processing for messages that otherwise would not received QoS processing. However, this solution typically prioritizes WAN traffic over LAN-to-WAN traffic, which may not be appropriate.

A WAN-based quality of service device can be used. However, the benefits of quality of service devices are significantly reduced when QoS device 110 is deployed on the WAN side of router 130 because the primary congestion point exists from the LAN to the WAN, which is not addressed in this configuration.

SUMMARY

Methods and apparatuses for management of network quality of service are described. In one embodiment, the present invention includes the following. A first network device, for example a router receives message from remote devices. An identifier that indicates the source of the message is associated with the message. The message is passed to a second network device, for example another router. The second network device modifies the identifier to indicate a destination of the message. Quality of service processing is performed for the message based on the identifier associated with the message. In one embodiment, the identifier is a Differentiated Services Code Point (DSCP) that is transmitted as part of the message header. In one embodiment, quality of service processing (or other types of processing) can be performed on messages as the messages pass from the WAN router to the LAN router. This processing can be performed in addition to, or in place of, processing that is performed on messages as they pass from the LAN router to the WAN router.

BRIEF DESCRIPTION OF THE DRAWINGS

The invention is illustrated by way of example, and not by way of limitation, in the figures of the accompanying drawings in which like reference numerals refer to similar elements.

FIG. 5 illustrates an Internet Protocol header having a DSCP field that can be used in quality of service processing.

DETAILED DESCRIPTION

Management of network services is described. In the following description, for purposes of explanation, numerous specific details are set forth in order to provide a thorough understand of the invention. It will be apparent, however, to one skilled in the art that the invention can be practiced without these specific details. In other instances, structures and devices are shown in block diagram form in order to avoid obscuring the invention.

In one embodiment, a router is described on a local area network (LAN) in addition to any routers deployed on a wide area network (WAN) coupled with the LAN having the router. A service management device is coupled between the two routers. The service management device can be any type of device that provides network management services on network traffic. The service management device can be, for example, a gateway, a router or any other provide network node.

The service management device provides management processing, for example, quality of service (QoS) processing, traffic shaping, type of service (ToS) processing, or class of service (CoS) processing. For messages between devices both coupled to the WAN router, the WAN router sends the messages to the LAN router. The LAN router then routes the messages back to the WAN router through the service management device, which provides management processing. The WAN router then sends the processed message to the destination device.

Figure 1:
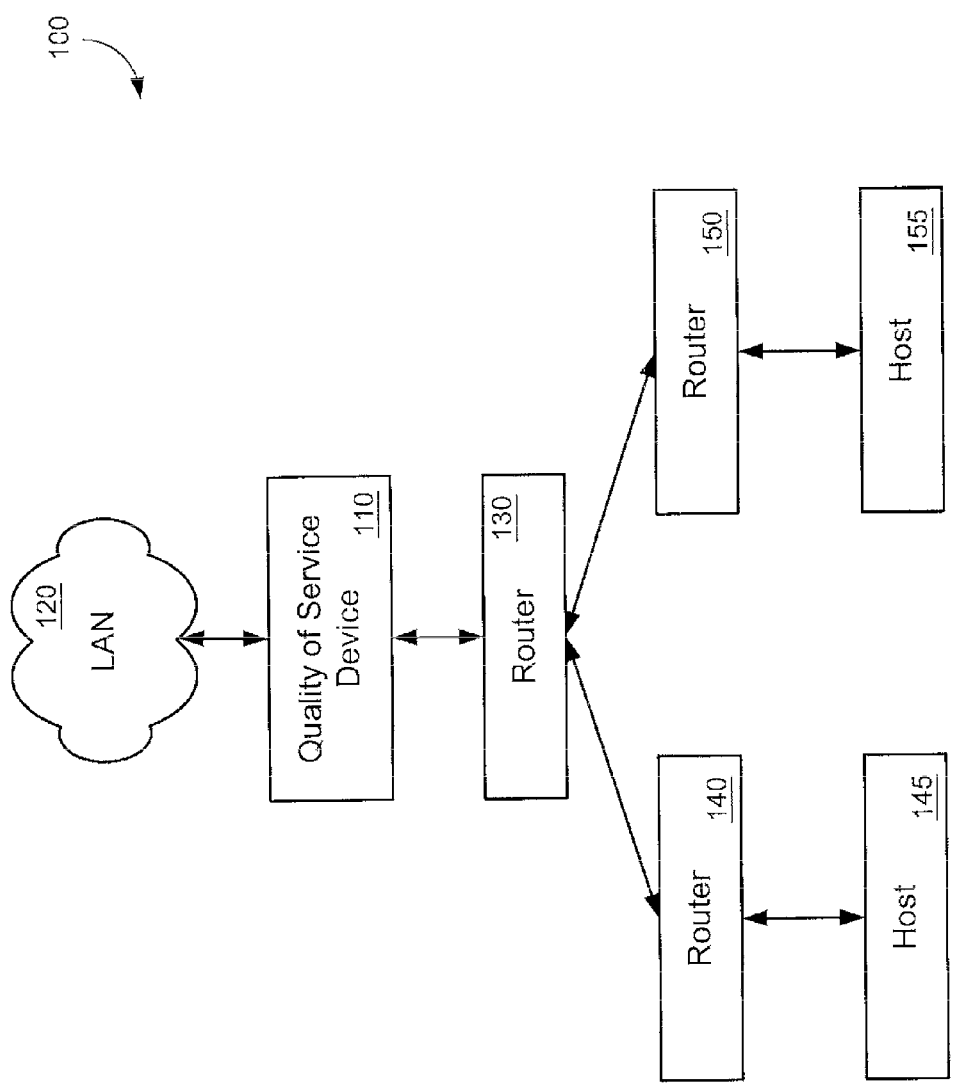
FIG. 1 is one embodiment of a prior art network configuration in which quality of service processing is not guaranteed for all messages.
Figure 2:
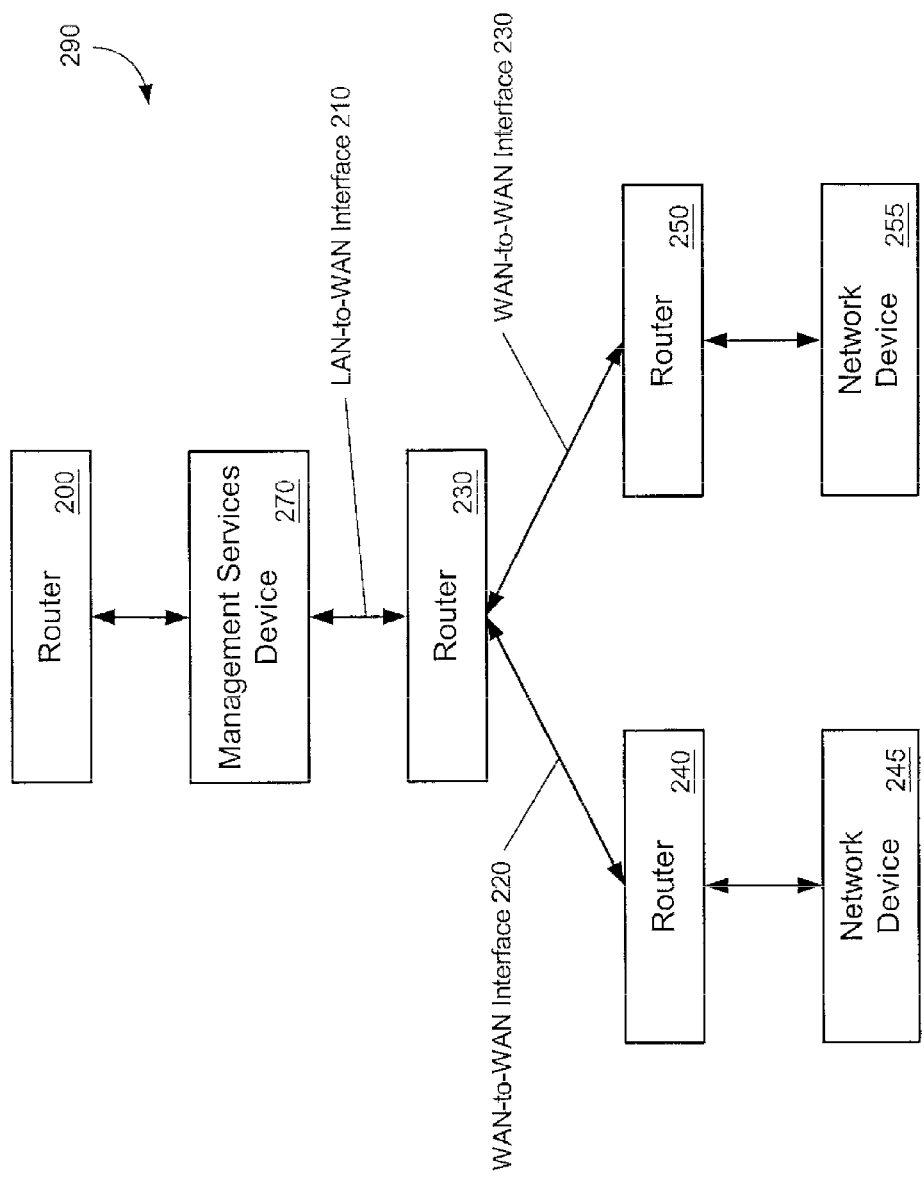
FIG. 2 is one embodiment of a network configuration in which service management processing is provided for WAN-to-WAN traffic with a LAN router.

FIG. 2 is one embodiment of a network configuration in which service management processing is provided for WAN-to-WAN traffic with a LAN router. While the example of FIG. 2 includes four routers, any number of routers can be supported and used to provide the service management processing described herein.

Network device 245 generates a message to be transmitted to network device 255. Network devices 245 and 255 can be any type of network devices for example, computer systems, printers, personal digital assistants (PDAs), etc. The message can be any type of message in any type of network formal. For example, the message can be an Internet Protocol (IP) packet, which is variable in length, or an Asynchronous Transfer Mode (ATM) cell, which is a fixed length. Network device 245 sends the message to router 240.

Router 240 analysis the message to determine the routing path and forwards the message to router 230 through WAN-to-WAN interface 220. Router 230 receives the message and analyzes the message to determine a routing path to the destination. Because management services device 270 is not coupled between router 230 and the destination, network device 255, management service processing (e.g., QoS processing) would not be performed if the message were directly routed to network device 255.

In order to provide management service processing, router 230 routes the message to router 200. Router 200 then sends the message back to router 230. By sending the message to router 200 when the message would not otherwise be sent to router 200 or any device on the network that would cause the message to pass through management services device 270 management services can be provided.

In general, routers that are part of a WAN (or other type of network) are coupled with other routers on the WAN. The connections between these routers are referred to as WAN-to-WAN interfaces (e.g., 220, 230). Management services devices are often deployed on a LAN side of a router and the interface between the router and the LAN devices (including the management services device) is referred to as a WAN-to-LAN interface (e.g., 210). By sending messages through a management services device to a router that would not normally be on the pant of a message and then sending the message back to the otherwise normal path for the message, management services processing can be provided to messages that would not otherwise be processed.

In one embodiment, when router 230 receives a message from network device 245 to network device 255, router 230 modifies the Differentiated Services Code Point (DSCP) in the header of the message to correspond to the source of the message. The message is then sent to router 200 through management services device 270.

In general, Differentiated Services (DiffServ or DS) is a protocol for specifying and controlling network traffic by class so that certain types of traffic get precedence, for example, voice traffic, which requires a relatively uninterrupted flow of data, might get precedence over other kinds of traffic. Differentiated Services use a policy or rule statements to determine how to forward a given network packet. For a given set of forwarding behaviors, known as per hop behaviors (PHBs), a six-bit field (the DSCP), in the Internet Protocol header, specifies the per hop behavior for a given flow of packets.

Note that the use of the DSCP field for QoS or other management service processing is different than prior use of DSCP. Thus, an existing field in an IP header can be used for a non-intended purpose (i.e., to provide routing information that can be used for QoS processing) to provide improved management service processing. In alternate embodiments, techniques other than use of the DSCP field can be used. Any technique in which uses source and destination identifiers and the concept of inbound and outbound traffic can route messages as described herein to provide improved management services processing.

In one embodiment, when router 200 receives a message from router 230, router 230 modifies the DSCP of the message to correspond to the destination of the message and sends the message back to router 200 through management services device 270. Management services device 270 provides quality of service processing on the message based on the destination of the message. Service management device 270 can also perform traffic shaping processing, class of service processing, type of service processing, and/or any other type of network policy processing.

In one embodiment, management services device 270 provides quality of service processing on messages that pass between router 230 and router 200. The quality of service processing can be performed on messages that pass in one direction (i.e., from router 230 to router 200 or router 200 to router 230) or on messages that pass in both directions. Quality of service processing can be performed in any manner Known in the art. Router 230 then forwards the message to router 250, which forwards the message to network device 255.

Figure 3:
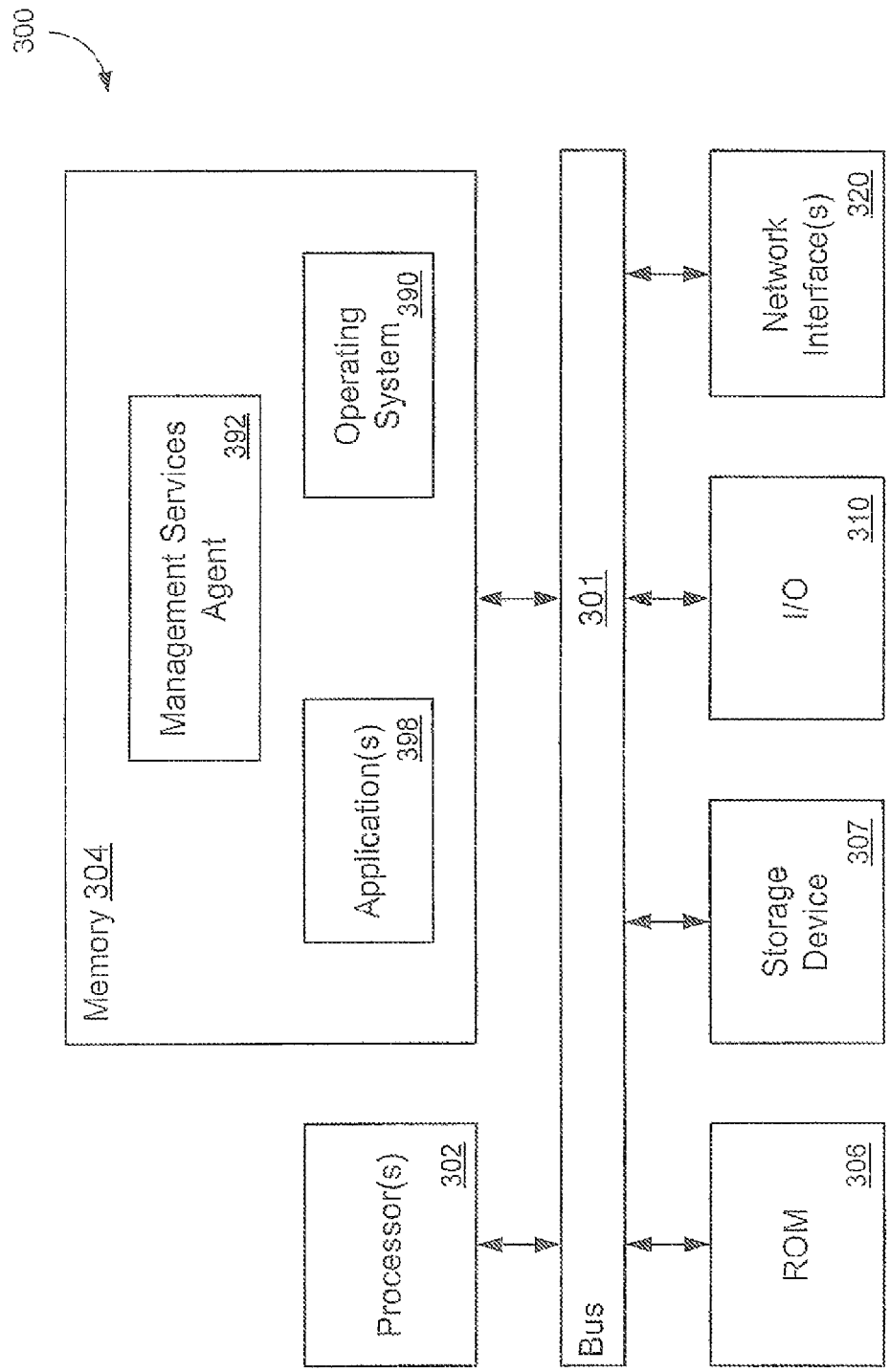
FIG. 3 is a block diagram of one embodiment of an electronic system that can be used for providing identifiers for quality of service processing.

In one embodiment, the routers, network devices and/or quality of service processor of FIG. 2 can be implemented as an electronic systems that executes sequences of instructions. The sequences of instructions can be stored by the electronic device or the instructions can be received by the electronic device (e.g., via a network connection). FIG. 3 is a block diagram of one embodiment of an electronic system that can be used for providing identifiers for quality of service processing. The electronic system illustrated in FIG. 3 is intended to represent a range of electronic systems, for example, computer systems, network access devices, routers, hubs, switches, etc. Alternative systems, whether electronic or non-electronic, can include more, fewer and/or different components.

Electronic system 300 includes bus 301 or other communication device to communicate information, and processor 302 coupled to bus 301 to process information. While electronic system 300 is illustrated with a single processor, electronic system 300 can include multiple processors and/or co-processors. Electronic system 300 further includes random access memory (RAM) or other dynamic storage device 304 (referred to as memory), coupled to bus 301 to store information and instructions to be executed by processor 302. Memory 304 also can be used to store temporary variables or other intermediate information during execution of instructions by processor 302.

In one embodiment, memory 304 includes operating system 390, which provides software control of hardware components of electronic system 300. Any type of operating system known in the art appropriate for electronic system 390 can be used. Memory 304 can also store application(s) 398, which represent one or more applications that can be executed by processor(s) 302.

In one embodiment, memory 304 includes management services agent 392. In alternate embodiments, management services agent 392 can be stored in ROM 306, implemented as hardware, or as any combination of hardware and software. In general, management services agent 392 provides the functionality described herein to route messages through a management services device (e.g., management services device 250 of FIG. 2).

If electronic device 300 is a WAN router, management services agent 392 analyzes an incoming message to determine whether the message should be routed to a LAN router in order to provide management services processing. In one embodiment, management 392 analyzes the header of the message to determine the source of the message. Management services agent 392 then causes the DSCP field in the header of the message to be modified to indicate the source of the message.

If electronic device 300 is a LAN router, management services agent 392 analyzes an incoming message to determine whether the message is from the WAN router and whether the message should be routed back to the WAN router. If so, management services agent 392 modifies the DSCP field to indicate the destination of the message and sends the message back to the WAN router through a management services device. The management services device provides QoS (and/or other) processing on the message.

Electronic system 300 also includes read only memory (ROM) and/or other static storage device 306 coupled to bus 301 to store static information and instructions for processor 302. Data storage device 307 is coupled to bus 301 to store information and instructions. Data storage device 307 such as a magnetic disk or optical disc and corresponding drive can be coupled to electronic system 300.

Electronic system 300 can also be coupled via bus 301 to input/output (I/O) devices 310, such as, for example, a cathode ray tube (CRT) or liquid crystal display (LCD), to display information to a user, a keyboard, a mouse, a trackball, or cursor direction keys to communicate direction information and command selections to processor 302. Electronic system 300 further includes network interfaces 320 to provide access to a network, such as a local area network.

Instructions are provided to memory from a storage device, such as magnetic disk, a read-only memory (ROM) integrated circuit, CD-ROM, DVD, via a remote connection (e.g., over a network via network interface 320) that is either wired or wireless providing access to one or more electronically-accessible media, etc. In alternative embodiments, hard-wired circuitry can be used in place of or in combination with software instructions. Thus, execution of sequences of instructions is not limited to any specific combination of hardware circuitry and software instructions.

An electronically-accessible medium includes any mechanism that provides (i.e., stores and/or transmits) content (e.g., computer executable instructions) in a form readable by an electronic device (e.g., a computer, a personal digital assistant, a cellular telephone). For example, a machine-accessible medium includes read only memory (ROM); random access memory (RAM); magnetic disk storage media; optical storage media; flash memory devices; electrical, optical, acoustical or other form of propagated signals (e.g., carrier waves, infrared signals, digital signals); etc.

Figure 4:
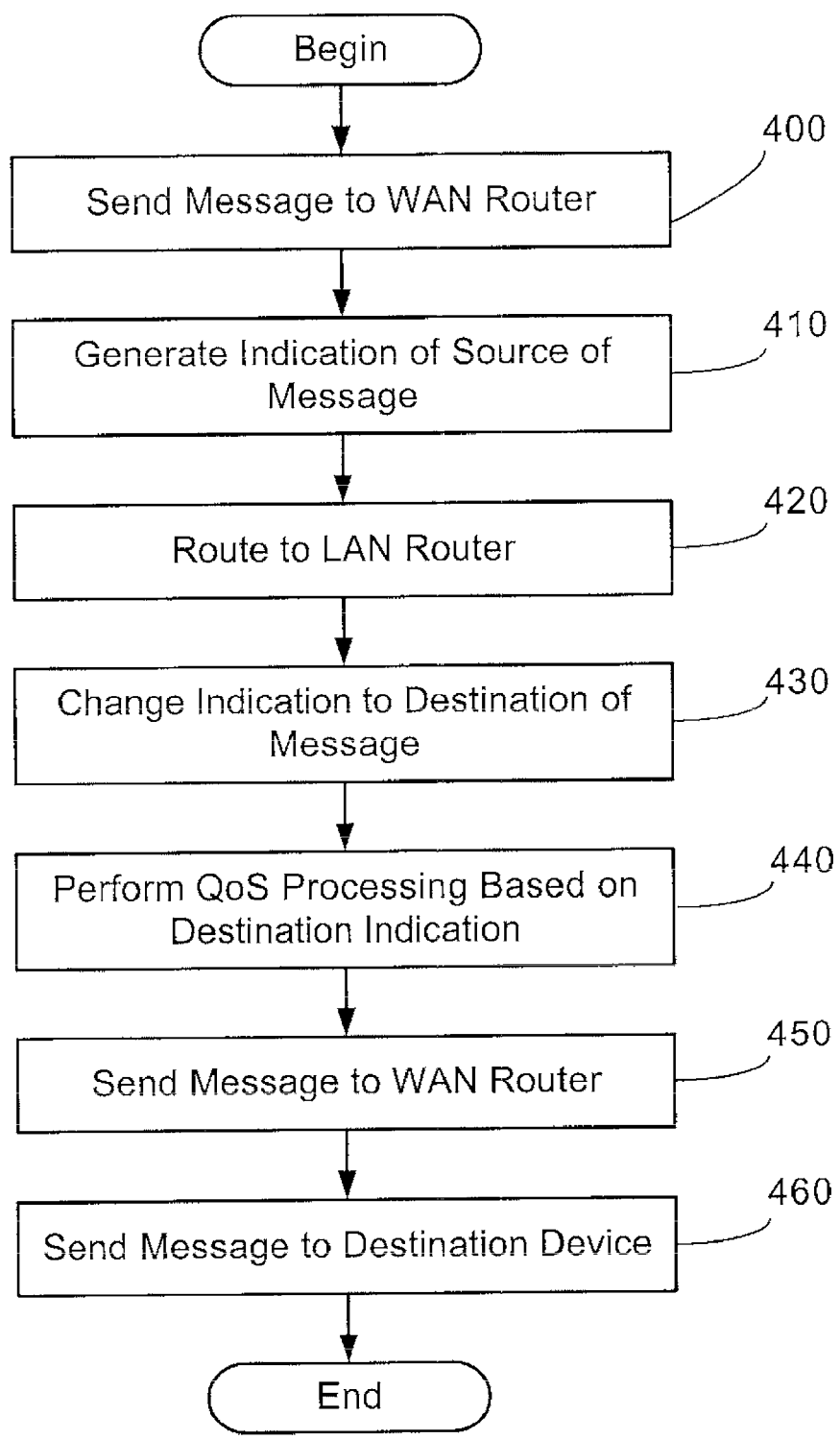
FIG. 4 is a flow diagram of a process in which quality of service processing is provided for WAN-to-WAN traffic with a LAN router.

FIG. 4 is a flow diagram of a process in which quality of service processing is provided for WAN-to-WAN traffic with a LAN router. Messages are sent from a source network device to a WAN router, 400. The destination network device is also coupled to the same WAN router through a different port than the source network device. Any number of routers or other network components can be coupled between the source network device and the WAN router as well as between the WAN router and the destination network device.

The WAN router generates an indication of the source or the message, 410. In one embodiment, the WAN router modifies a DSCP field in the header of the message to indicate the source network device. Other indicators can also be used. The WAN router sends the message to a LAN router, 420. In one embodiment, the message is sent to the LAN router through a quality of service device or other network management device. In an alternate embodiment, the message passes through the quality of service device only on its return to the WAN router.

In one embodiment, quality of service processing (or other types of processing) can be performed on messages as the messages pass from the WAN router to the LAN router. This processing can be performed in addition to, or in place of, processing that is performed on messages as they pass from the LAN router to the WAN router.

The LAN router changes the indicator (e.g., the DSCP field) to indicate the destination network device, 430. The LAN router sends the message to the quality of service device, which performs quality of service processing on the message, 440. The message is returned to the WAN router 450. The message is sent to the destination network device, 460, in accordance with the quality of service parameters provided by the quality of service device.

FIG. 5 illustrates an Internet Protocol header having a DSCP field that can be used in quality of service processing. In general, packet 500 includes header 520 and data portion 530, each of which can have any number of bits or bytes depending on the network protocol being used. In one embodiment, header 520 includes DSCP field 510 that can be used as described herein to provide network management services. In one embodiment, DSCP field 510 is six bits; however, any number of bits can be used. In alternate embodiments, fields other than DSCP field 510 can be used in the manner described herein.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. In a network environment comprising a first host, a second host, a first network device, a second network device, and a QoS device, a method allowing the QoS device to operate on packet flows transmitted between hosts, the method comprising:
   receiving, at the first network device, a packet transmitted from the first host and addressed to the second host, wherein the packet comprises a header including a plurality of header fields;
   diverting the packet from a routed communication path between the first and second hosts by transmitting the packet from the first network device to the second network device,
   wherein the second network device is disposed out of the routed communication path;
   receiving, at the first network device, the packet from the second network device; and
   forwarding the packet from the first network device along the routed communication path to the second host;
   wherein during diverting the packet, the packet traverses the QoS device thereby enabling the QoS device to provide quality of service processing for the packet, wherein the QoS device is disposed between the first and second network devices, and wherein the QoS device is located outside of the routed communication path between the first and second hosts.

2. The method of claim 1 wherein the first network device is a first router and the second network device is a second router.

3. The method of claim 2 wherein the packet is transmitted to the first router from a source router coupled with the first router and the packet is forwarded to a destination router coupled to the first router.

4. The method of claim 1 wherein the first network device is a WAN router, and the second network device is a LAN router.

5. A system comprising:
- a first network device operably coupled to a routed path between a source host and a destination host, the first network device operative to receive, from the source host, a packet addressed to the destination host;
- a second network device coupled to the first network device by a second path outside the routed path to receive the packet from the first network device; and
- a quality of service device coupled to the second path between the first network device and the second network device to receive the message when transmitted between the first and second network devices, and to perform quality of service processing on the message;
- wherein, in response to receiving the packet from the source host, the first network device is operative to divert the packet from the routed path along the second path to the second network device, receive the packet returned from the second network device, and forward the message to the destination host; wherein during diversion of the packet, the packet traverses the QoS device thereby enabling the QoS device to provide quality of service processing for the packet.

6. The system of claim 5 wherein the first network device is a first router and the second network device is a second router.

* * * * *